United States Patent
Nogami et al.

(10) Patent No.: US 6,807,567 B2
(45) Date of Patent: Oct. 19, 2004

(54) DATA DISTRIBUTION SYSTEM AND DATA DISTRIBUTION METHOD

(75) Inventors: Kosuke Nogami, Tokyo (JP); Tomohiro Igakura, Tokyo (JP); Toru Egashira, Tokyo (JP)

(73) Assignee: NEC Corporation (JP)

( * ) Notice: Subject to any disclaimer, the term of this patent is extended or adjusted under 35 U.S.C. 154(b) by 548 days.

(21) Appl. No.: 09/978,956

(22) Filed: Oct. 16, 2001

(65) Prior Publication Data

US 2002/0062332 A1 May 23, 2002

(30) Foreign Application Priority Data

Oct. 16, 2000 (JP) ...................................... 2000-315621

(51) Int. Cl.[7] .............................................. G06F 9/00
(52) U.S. Cl. ...................................... 709/214; 709/203
(58) Field of Search ................................ 709/203, 214; 718/103, 105

(56) References Cited

U.S. PATENT DOCUMENTS

| | | | | |
|---|---|---|---|---|
| 5,774,668 A | * | 6/1998 | Choquier et al. | 709/223 |
| 6,067,580 A | * | 5/2000 | Aman et al. | 719/330 |
| 6,167,427 A | * | 12/2000 | Rabinovich et al. | 709/201 |
| 6,240,454 B1 | * | 5/2001 | Nepustil | 709/229 |
| 6,446,218 B1 | * | 9/2002 | D'Souza | 714/4 |
| 6,671,259 B1 | * | 12/2003 | He et al. | 370/238 |
| 6,718,361 B1 | * | 4/2004 | Basani et al. | 709/201 |
| 6,725,253 B1 | * | 4/2004 | Okano et al. | 709/203 |

* cited by examiner

Primary Examiner—Kevin Verbrugge
(74) Attorney, Agent, or Firm—Dickstein, Shapiro, Morin & Oshinsky, LLP.

(57) ABSTRACT

The invention provides a data distribution system and method which can control distribution of data in a network configuration wherein the number of servers used in an initial stage of data distribution is comparatively small but is increased in accordance with a situation so that clients can access impartially. The data distribution system includes a distribution server, a plurality of reception servers, and a plurality of clients. The distribution server includes a distribution control section including an order determination section for calculating an evaluation value between each of the reception servers and the clients based on a predetermined evaluation expression and determining an order of the reception servers to which data are to be transmitted in accordance with the evaluation values. The order determination section executes an ideal solution calculation step, a permutation set production step and a selection order determination step to select the reception servers so as to be accessed impartially from the clients even if a reception server to be used for reception of data is increased.

12 Claims, 10 Drawing Sheets

DATA DISTRIBUTION SYSTEM AND DATA DISTRIBUTION METHOD

BACKGROUND OF THE INVENTION

1. Field of the Invention

The present invention relates to a data distribution system and a data distribution method wherein data are distributed to a plurality of servers provided on a network and a recording medium on which a program for executing the data distribution method is recorded.

2. Description of the Related Art

A data distribution system and a data distribution method for distributing various types of data to a plurality of servers provided on a network are described with reference to FIGS. 9 and 10. FIG. 9 shows a configuration of a conventional data distribution system, and FIG. 10 illustrates a conventional data distribution method executed by the data distribution system of FIG. 9. Referring first to FIG. 9, the data distribution system 11 shown includes a distribution server 12, a distribution control apparatus 13 for controlling the distribution method of data of the distribution server 12, a plurality of reception servers 14 (in FIG. 9, five servers 14a, 14b, 14c, 14d and 14e) for receiving data from the distribution server 12, and a plurality of clients 15 (in FIG. 9, three clients 15a, 15b and 15c) connected to the reception servers 14c, 14d and 14e, respectively.

The data distribution system 11 operates in such a manner as illustrated in FIG. 10. Referring to FIG. 10, the distribution server 12 acquires, first in step S601, a list of the reception servers 14 which are included in the communication network from the distribution control apparatus 13. Then in step S602, the distribution server 12 distributes the data to all of the reception servers 14 included in the list acquired in step S601. It is to be noted that the reception servers 14 (14a to 14e) of FIG. 9 are provided to cache data and can store contents data of the WWW (World Wide Web) and streaming media data of a live broadcast and so forth.

Conventionally, the arrangement of the reception servers 14 of the data distribution system 11 having such a configuration as described above is in most cases determined manually, and once a reception servers 14 are installed, then the positions of the reception servers 14 are changed rarely. Further, since a great number of such reception servers 14 are installed independently of the demand by users, the data distribution system 11 has a problem in that it includes an excessively great number of distribution destinations and therefore suffers from excessively high network traffic and besides requires a high cost to cache data in the reception servers 14.

SUMMARY OF THE INVENTION

It is an object of the present invention to provide a data distribution system and a data distribution method which can control distribution of data in a network configuration wherein the number of servers used in an initial stage of data distribution is comparatively small but is increased in accordance with a situation so that clients can access impartially.

In order to attain the object of the present invention, there is provided a data distribution system of a network configuration, comprising a distribution server, a plurality of reception servers for receiving data from the distribution server, and a plurality of clients which utilize the reception servers, the distribution server including order determination means for calculating an evaluation value between each of the reception servers and the clients based on a predetermined evaluation expression and determining an order of the reception servers to which data are to be transmitted in accordance with the evaluation values, the order determination means selecting the reception servers so as to be accessed impartially from the clients even if a reception server to be used is increased.

The order determination means may include ideal solution calculation means for selecting combinations of x reception servers from among the reception servers, whose number is n, n being an integer, x being an integer from 1 to n, calculating, for each of the combinations, an evaluation value between each of the reception servers belonging to the combination and the clients connected to the reception server in accordance with the evaluation value, evaluating the evaluation values of the combinations in accordance with an evaluation method determined in advance to select the highest evaluation value from among the evaluation values, determining the selected evaluation value as an ideal solution for the x reception servers, successively determining the ideal solution for x=1 to n to determine a set of n ideal solutions and storing the ideal solutions as evaluation values of the entire network, permutation set production means for producing a set of permutations of the n reception servers, and selection order determination means for selecting y reception servers from each of the permutations produced by the permutation set production means, y being an integer successively increasing from 1 to n, calculating evaluation values between they reception servers and those clients connected to the y reception servers in accordance with the evaluation expression, subtracting the ideal solution for the y reception servers determined by the ideal solution calculation means from the evaluation values to determine differences, adding the differences for y=1 to n to calculate a difference sum for the permutation, determining the difference sum for all of the permutations and selecting the permutation which exhibits the smallest difference sum.

The order determination means may alternatively or additionally include individual evaluation value calculation means for calculating, for each of the n reception servers, an evaluation value between the reception server and those clients connected to the reception server in accordance with the evaluation expression, all evaluation value calculation means for determining the evaluation value with regard to all of the n reception servers and calculating a set of the evaluation values, selection order determination means for evaluating the set of evaluation values produced by the all evaluation value calculation means in accordance with an evaluation method determined in advance to select that one of the reception servers which corresponds to the highest evaluation value and excepting the selected reception server from the group of n reception servers, and discrimination means for discriminating whether or not the selection order of all of the reception servers is determined finally.

According to another aspect of the present invention, there is provided a data distribution method for a data distribution system of a network configuration which includes a distribution server, a plurality of reception servers for receiving data from the distribution server, and a plurality of clients which utilize the reception servers, comprising an order determination step executed by the distribution server of calculating an evaluation value between each of the reception servers and the clients based on a predetermined evaluation expression and determining an order of the reception servers to which data are to be transmitted in accordance with the evaluation values such that the reception servers are selected so as to be accessed impartially from the clients even if a reception server to be used is increased.

The order determination step for selection of the reception servers may include an ideal solution calculation step of selecting combinations of x reception servers from among the reception servers, whose number is n, n being an integer, x being an integer from 1 to n, calculating, for each of the combinations, an evaluation value between each of the reception servers belonging to the combination and the clients connected to the reception server in accordance with the evaluation value, evaluating the evaluation values of the combinations in accordance with an evaluation method determined in advance to select the highest evaluation value from among the evaluation values, determining the selected evaluation value as an ideal solution for the x reception servers, successively determining the ideal solution for x=1 to n to determine a set of n ideal solutions and storing the ideal solutions as evaluation values of the entire network, a permutation set production step of producing a set of permutations of the n reception servers, and a selection order determination step of selecting y reception servers from each of the permutations produced by the permutation set production step, y being an integer successively increasing from 1 to n, calculating evaluation values between they reception servers and those clients connected to the y reception servers in accordance with the evaluation expression, subtracting the ideal solution for the y reception servers determined by the ideal solution calculation step from the evaluation values to determine differences, adding the differences for y=1 to n to calculate a difference sum for the permutation, determining the difference sum for all of the permutations and selecting the permutation which exhibits the smallest difference sum.

The order determination step for selection of the reception servers may alternatively or additionally include an individual evaluation value calculation step of calculating, for each of then reception servers, an evaluation value between the reception server and those clients connected to the reception server in accordance with the evaluation expression, an all evaluation value calculation step of determining the evaluation value with regard to all of the n reception servers and calculating a set of the evaluation values, a selection order determination step of evaluating the set of evaluation values produced by the all evaluation value calculation step in accordance with an evaluation method determined in advance to select that one of the reception servers which corresponds to the highest evaluation value and excepting the selected reception server from the group of n reception servers, and a discrimination step of discriminating whether or not the selection order of all of the reception servers is determined finally.

In the data distribution system and method, where the coordinates of each of the reception servers are represented by (Sx, Sy) and the coordinates of each of the clients are presented by (Cx, Cy), preferably the evaluation value is given by $\uparrow |Sx-Cx|+|Sy-Cy|$.

With the data distribution system and the data distribution system, even where the number of servers utilized in a certain reception server group varies dynamically, a selection order of servers which realizes an arrangement of the servers which always makes accessing from clients impartial can be determined.

The reason is that the distribution control means of the distribution server includes the server selection order determination means, which determines the selection order of the servers using evaluation values calculated in accordance with an evaluation expression determined in advance.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1:
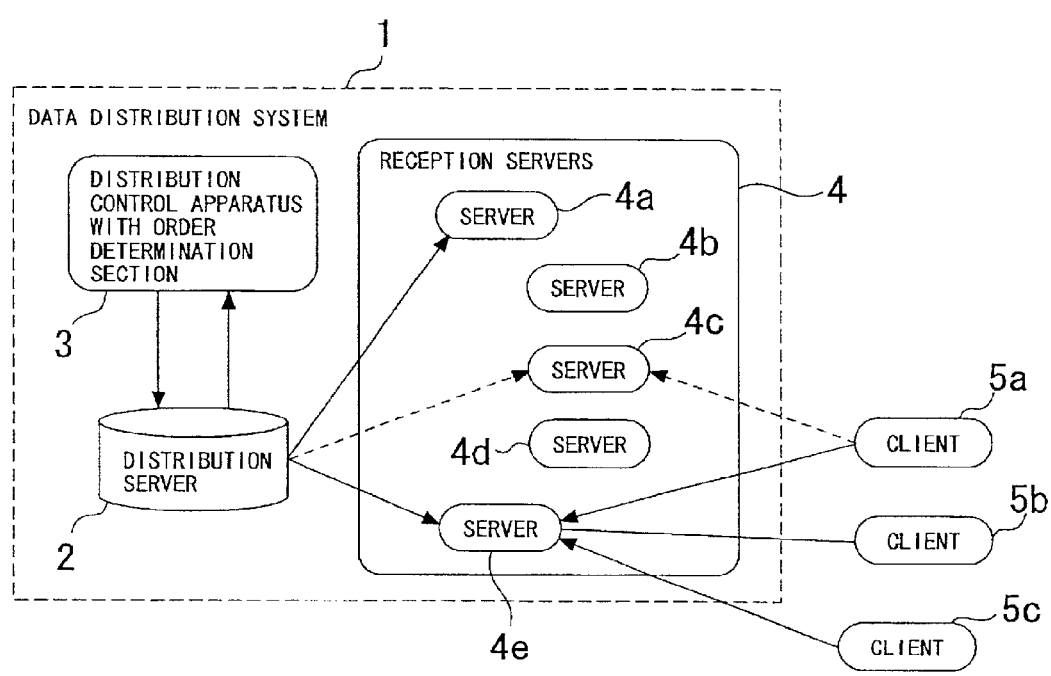
FIG. 1 is a diagrammatic view showing a configuration of a data distribution system to which the present invention is applied.

Referring to FIG. 1, there is shown a configuration of a data distribution system to which the present invention is applied. The data distribution system is generally denoted at 1 and includes a distribution server 2, a distribution control apparatus 3 including a predetermined server selection order determination section which is hereinafter described, a plurality of reception servers 4 (in FIG. 1, five servers 4a, 4b, 4c, 4d and 4e) for receiving data from the distribution server 2, and a plurality of clients 5 (in FIG. 1, three clients 5a, 5b and 5c) connected to the reception servers 4.

Figure 4:
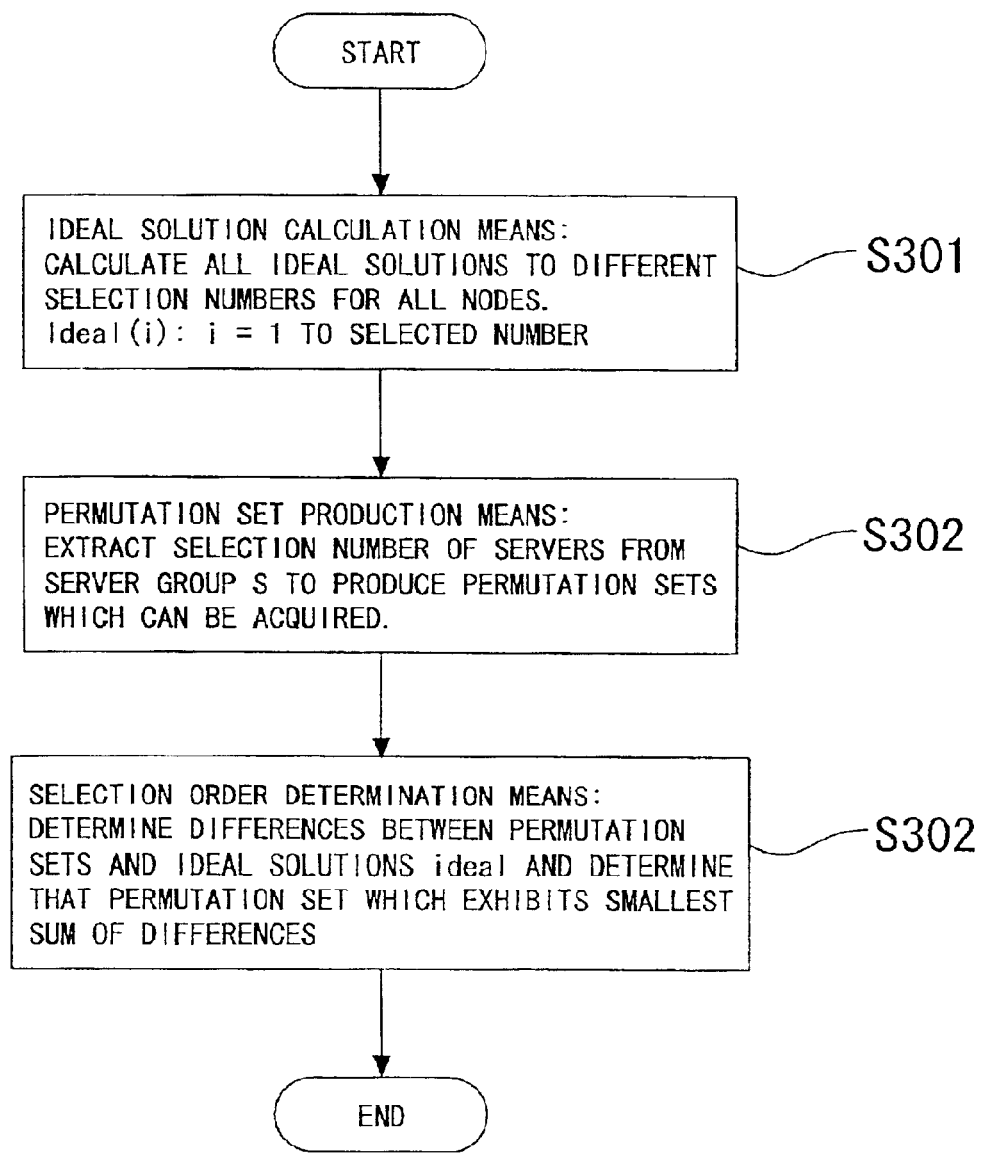
FIG. 4 is a flow chart illustrating a server selection order determination method of the data distribution system of FIG. 1.
Figure 9:
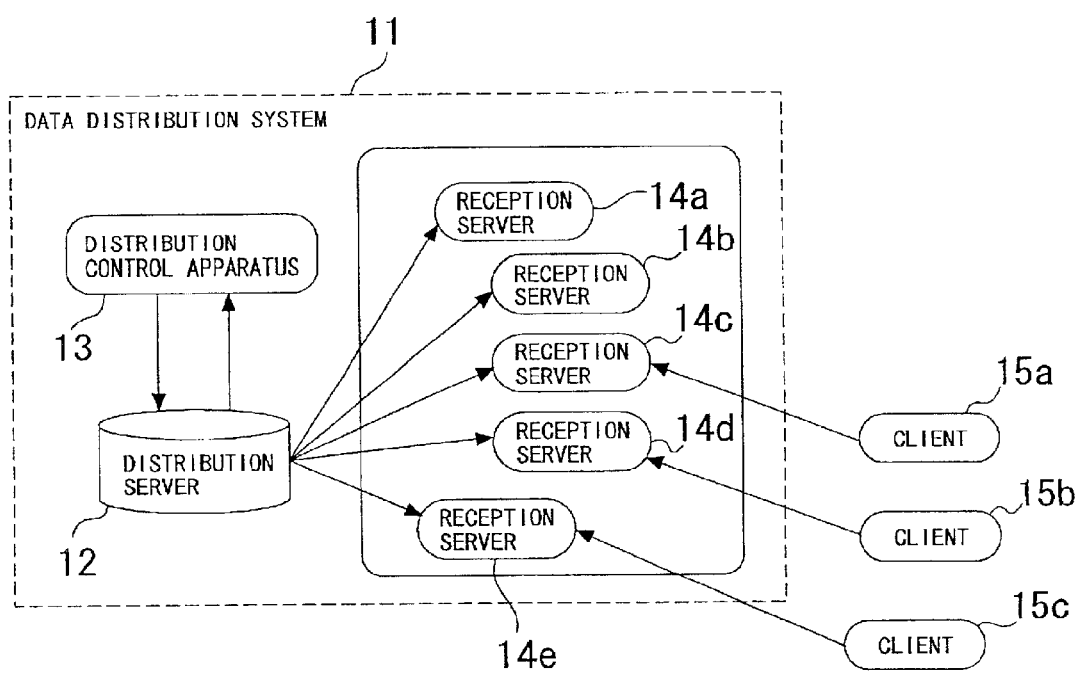
FIG. 9 is a diagrammatic view showing a configuration of a conventional data distribution system.
Figure 10:
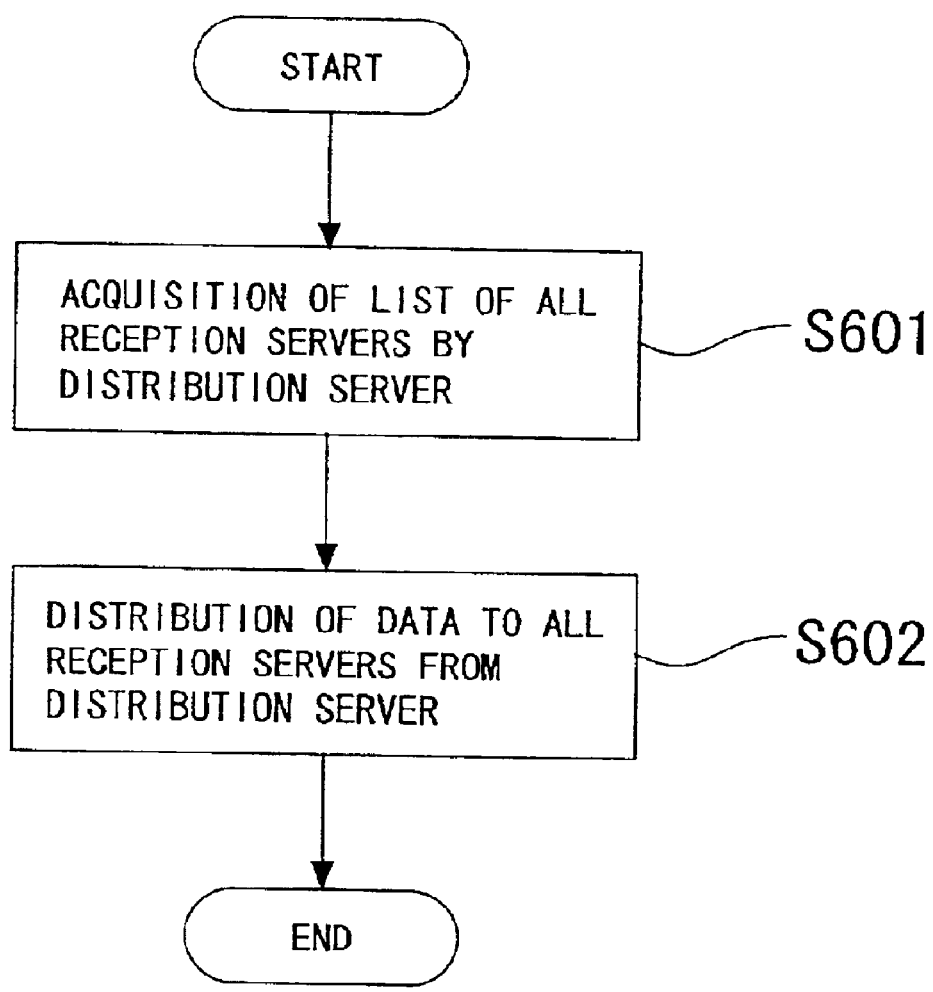
FIG. 10 is a flow chart illustrating operation of the data distribution system of FIG. 9.

It is to be noted that, in a data distribution service of distributing various types of data as contents, some reception server cannot accept all data depending upon the execution environment and so forth different from conventional reception servers (the reception servers 14a to 14e of FIG. 9), and it is assumed that, among the reception servers 4 shown in FIG. 4, the reception server 4d cannot accept data, but the other reception servers 4a, 4b, 4c and 4e can receive data.

Figure 2:
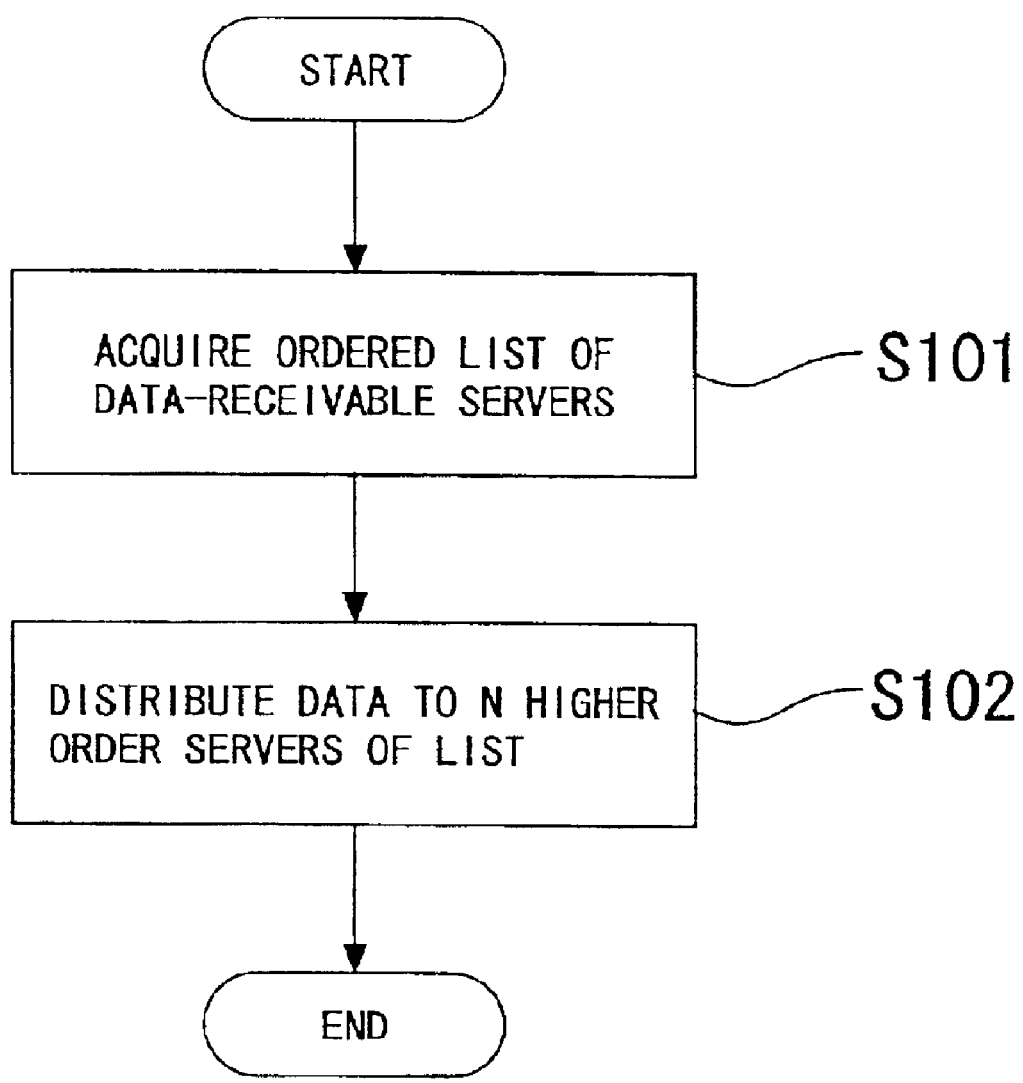
FIG. 2 is a flow chart illustrating a procedure of operation of the data distribution system of FIG. 1.

Operation of the data distribution system 1 having the configuration described above is described with reference to FIG. 2. First in step S101, the distribution server 2 acquires an ordered list of the reception servers 4 which can receive data from the distribution control apparatus 3 which includes the selection order determination section. Then in step S102, the distribution server 2 distributes data to N ones of the reception servers 4 included in the acquired list where N is a number of initially arranged servers. It is to be noted that, in FIG. 1, N=2, and data are distributed to the reception server 4a and the reception server 4e. Further, in the present specification, the term "to arrange" used in regard to servers is used to signify to render or keep servers operative to receive data.

Figure 3:
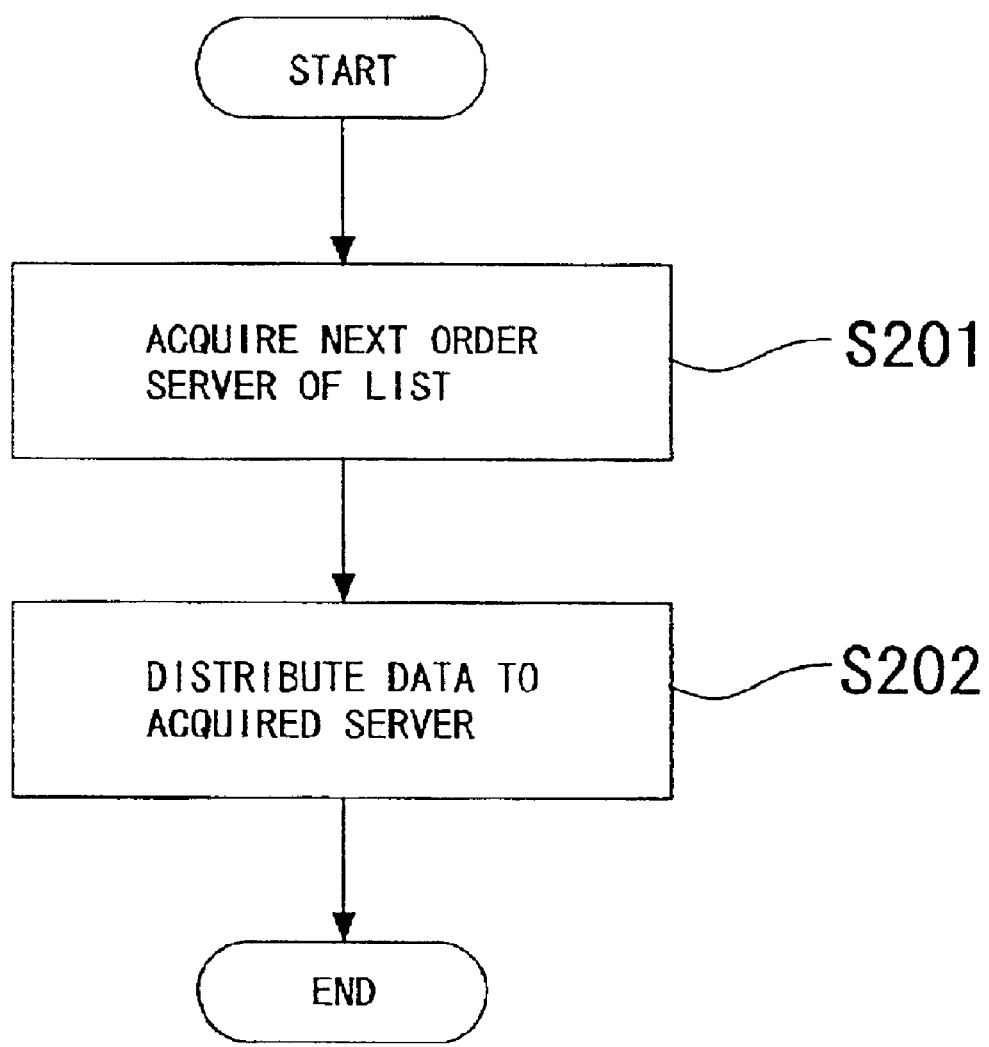
FIG. 3 is a flow chart illustrating another procedure of operation of the data distribution system of FIG. 1.

Now, operation of the data distribution system 1 when the load is excessively high to the number of distributing servers at present and one reception server 4 should be added as a distributing server is described. In this instance, the data distribution system 1 performs a process illustrated in the flow chart of FIG. 3. Referring to FIG. 3, the distribution server 2 acquires a reception server positioned next to the reception servers 4a and 4e acquired already on the list acquired in step S101 of FIG. 2. Then, the distribution server 2 distributes data to the reception server acquired in step S201.

In this manner, data are distributed not unconditionally to all reception servers, but particular reception servers 4 are selectively arranged from within the group of reception servers 4 which can receive data by the server selection order determination section provided in the distribution control apparatus 3 so that they can normally be accessed impartially by clients. Consequently, the load to the network can be dispersed, and consequently, increase of the traffic can be prevented and the load when the reception servers 4 cache data can be reduced.

It is to be noted that, since distribution of data to a large number of reception servers in a situation wherein the demand of users is unknown requires a high cost in terms of increase of the traffic of the network, in an initial-stage of data distribution, the number of reception servers into which data are to be placed is comparatively small with a high degree of possibility. Therefore, the server arrangement in an initial stage wherein the server number is comparatively small must realize impartial accessing as far as possible so that it may cope with users whose demand is unknown.

Further, when the demand of users increases, the load can be dispersed by distributing data newly to one of servers to which the data have not been distributed. In this instance, taking the arrangement of such server with those reception servers in which data are distributed already into consideration, preferably the server to which the data are to be distributed is selected so as to achieve an arrangement advantageous to the clients.

In order to make further clear the server selection order determination section of the distribution control apparatus 3 in the data distribution system 1 described above, several working examples of the data distribution system and the data distribution method of the present invention are described more particularly below. It is to be noted that, since individual steps of flow charts used in the following description of server selection order determination methods according to several working examples of the present invention can be regarded individually as particular functions or as processes performed by particular means implemented by a computer program, the steps are referred to also as such particular means.

WORKING EXAMPLE 1

First, the data distribution system and the data distribution method according to the first working example of the present invention is described with reference to FIG. 4 which is a flow chart illustrating a server selection order determination method executed by the server selection order determination section of the distribution control apparatus 3 of the data distribution system of the first working example. Referring to FIG. 4, the server selection order determination section includes ideal solution calculation means for calculating ideal solutions (step S301), permutation set production means for producing permutations set from a group of reception servers (step S302), and selection order determination means for determining a selection order of the reception servers (step S303).

Operation of the data distribution system which includes the server selection order determination section just described in the distribution control apparatus 3, that is, the data distribution method of the first working example, is described. The data distribution method of the first working example is configured so as to make the relationship between the clients 5 and the reception servers 4 impartial in average and determines the order of the reception servers 4 taking the entire selection order into consideration.

First, input information is passed to the ideal solution calculation means of step S301. The input information includes information regarding the group of reception servers which can receive contents, information regarding the clients 5, an evaluation expression regarding the reception servers 4 and the clients 5, and so forth. Various expressions can be adopted as the evaluation expression. For example, a simple square distance may be adopted, or another evaluation expression which takes the load on the network into consideration may be adopted.

It is to be noted that, in the following description, the reception server group of the input information is represented by S, the individual reception servers are represented by $S(i)$ ($i=1, \ldots n$), the set of clients is presented by C, and the individual clients are represented by $C(j)$ ($j=1, \ldots, m$), and the evaluation expression is given as the next expression (1):

$$F(S(i), C(j)) \tag{1}$$

First, the ideal solution calculation means of step S301 is used to determine the ideal solutions for all reception receivers included in the network system. The ideal solutions here signify ideal solutions when the selection number is successively increased such as when one reception server is selected, when two reception servers are selected, ..., and when n reception servers are selected, and each ideal solution can be determined using the evaluation expression $F(S(i), C(j))$ between a client and a reception server.

Evaluation of one reception server using the evaluation expression is described. First, the evaluation expression is used to determine the scores between the one reception server and all clients connected to the reception server, and then the scores are summed to determine the evaluation value for the reception server. Thus, the evaluation value is given by the following expression (2):

$$\sum_{j=1}^{m} F(S(i), C(j)) \tag{2}$$

On the other hand, where a plurality of reception servers are involved, it is assumed that each client accesses a reception server positioned nearest to the client, and an evaluation value for each of the reception servers is determined as a score. Then, such scores are summed to obtain an evaluation value E of the node arrangement where the plurality of reception servers are involved. The evaluation value E is given by the following expression (3):

$$E = \sum_{i=1}^{n} \sum_{j=1}^{m} F(S(i), C(j)) \tag{3}$$

Accordingly, an ideal solution is a combination of reception servers which exhibits the highest evaluation value in accordance with the evaluation method described above for each of the cases wherein the number of reception servers is 1, 2, . . . . The evaluation values for the different numbers of reception servers produced in step S301 are represented as ideal solutions Ideal(i) (i=1, . . . , n). The ideal solutions are used to determine an actual reception server arrangement.

Then, the permutation set production means of step S302 produces a permutation set from the reception server group S. Where the reception server group S can receive data and it is intended to selectively arrange a particular reception server or servers from within the reception server group S, since the number of orders in which a particular number of servers are extracted from the reception server group S is equal to the number (nPn) of permutations of the reception server group S, a permutation set of them is produced. One of the permutations of the permutation set thus produced is represented by P(i) where i is the order number from the top of the permutations.

Then, the selection order determination means of step S303 makes use of the ideal solutions and the permutation sets determined in steps S301 and S302, respectively, to determine a selection order of the reception servers. In particular, when the top reception server is extracted from a certain permutation set P(i), since only one reception server is involved in the network system, the evaluation value E(1) for the arranged reception server of P(1) is determined first, and then the difference diff(1) of the evaluation value E(1) from the evaluation value of the ideal solution Ideal (1) where the number of reception servers is 1.

Then, it is assumed that two reception servers of P(1) and P(2) are selected, and the evaluation value E(2) for the two reception servers is determined and then the difference diff(2) of the evaluation value E(2) from the ideal solution Ideal(2) is determined. Then, the processing described is repeated by n times equal to the number of the reception servers to determine diff(i) (i=1, . . . , n). Where the sum of the differences is represented by D, D is given by the following expression (4):

$$D = \sum_{i=1}^{n} \text{diff}(i) \tag{4}$$

This process is performed for all of the permutation sets produced in step S302, and the sum D of the differences from the ideal solutions for each permutation set is determined. Then, that one of the sums D determined in this manner which has the lowest value is determined. The selection order of the reception servers according to the permutation of the sum D which exhibits the lowest value can be determined as a combination which exhibits a value near in average to the evaluation values of the ideal solutions. In this manner, with the data distribution system and the data distribution method of the present working example, even if the number of reception servers increases, the impartiality in accessing from clients can be maintained.

WORKING EXAMPLE 2

Figure 5:
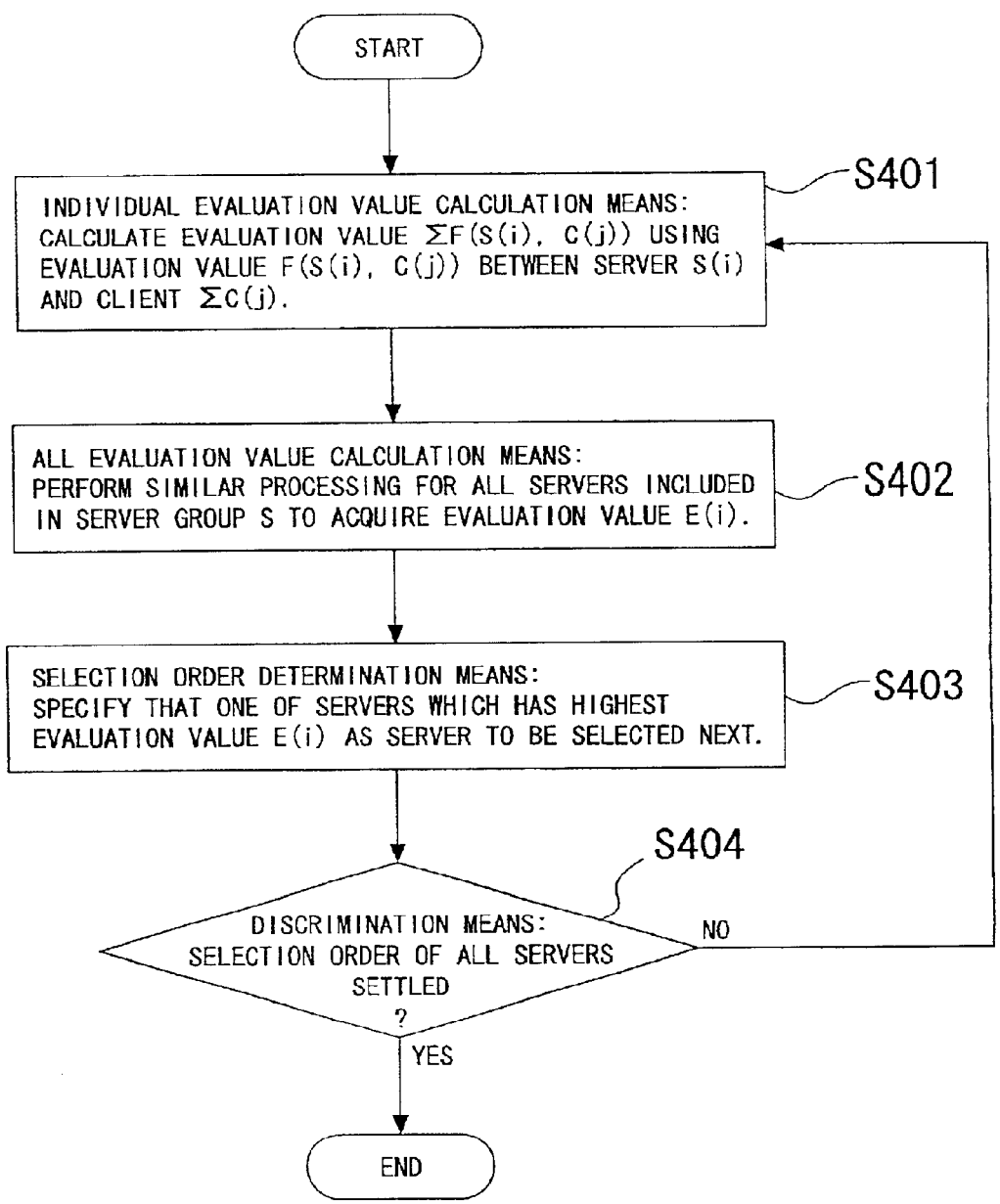
FIG. 5 is a flow chart illustrating another server selection order determination method of the data distribution system of FIG. 1.

Now, the data distribution system and the data distribution method according to the second working example of the present invention are described with reference to FIG. 5 which is a flow chart illustrating a server selection order determination method executed by the server selection order determination section of the distribution control apparatus 3 of the data distribution system of the second working example. Referring to FIG. 5, the server selection order determination section includes individual evaluation value calculation means for calculating evaluation values between the reception servers 4 and the clients 5 (step S401), all evaluation value calculation means for performing similar processing to all servers included in a reception server group (step S402), selection order determination means for comparing the evaluation values determined in step S402 to determine a selection order of the reception servers, and discrimination means for discriminating whether or not an order has been determined for all reception servers (step S404).

The method in the present working example is characterized in that, different from the method in the first working example described hereinabove, the order is not determined taking the entire order into consideration but determined sequentially in order to achieve the best arrangement of reception servers at the point of time.

It is assumed here that, similarly as in the first working example, the input information includes information regarding a set of reception servers, information regarding the clients, an evaluation expression regarding a reception server and clients, and so forth. The reception server group of the input information is represented by S, the individual reception servers are represented by S(i) (i=1, . . . , n), the set of clients is presented by C, and the individual clients included in the set C are represented by C(j) (j=1, . . . , m), and the evaluation expression is given as the function F (S(i),C(j)) regarding S(i) and C(j).

First, the individual evaluation value calculation means of step S401 is used to determine an evaluation expression for a certain reception server S(i) from all clients. The evaluation E(i) is given by the following expression (5):

$$E(i) \sum_{j=1}^{m} F(S(i), C(j)) \tag{5}$$

Then, the all evaluation value calculation means of step S402 is used to perform similar processing for all of the reception servers included in the reception server group S to determine individual evaluation values. In this instance, the evaluation value E where a plurality of reception servers are arranged already is given by the following expression (6):

$$E = \sum_{i=1}^{n} \sum_{j=1}^{m} F(S(i), C(j)) \tag{6}$$

Consequently, the evaluation values E(i) (i=1, . . . , n) are determined. Then, the selection order determination means of step S403 specifies, based on an evaluation technique determined in advance, that one of the evaluation values E(i) (i=1, . . . , n) which has the highest value is selected. The highest evaluation value E(i) represents an optimum selection at this point of time, and the corresponding reception server is specified as a server to be selected next and the thus specified server is excepted from within the reception server group S.

Then, the discrimination means of step S404 discriminates whether or not a selection order of all servers included in the reception server group S has been determined. If the selection order has not been determined as yet, then the processing in steps S401 to S403 is repetitively performed. After the selection order of all servers is determined, the result is outputted. This is performed until the selection order of all servers included in the reception server group S is determined. Thus, even if the number of reception servers is increased, a server arrangement which maintains the impartiality in accessing from the clients can be achieved.

WORKING EXAMPLE 3

Now, the data distribution system and the data distribution method according to the third working example of the present invention are described with reference to FIG. 6 which is a flow chart illustrating a server selection order determination method executed by the server selection order determination section of the distribution control apparatus 3 of the data distribution system of the second working example. The method in the present working example is characterized in that the server selection order determination methods in the first and second working examples described above are combined to improve the impartiality among clients.

Figure 6:
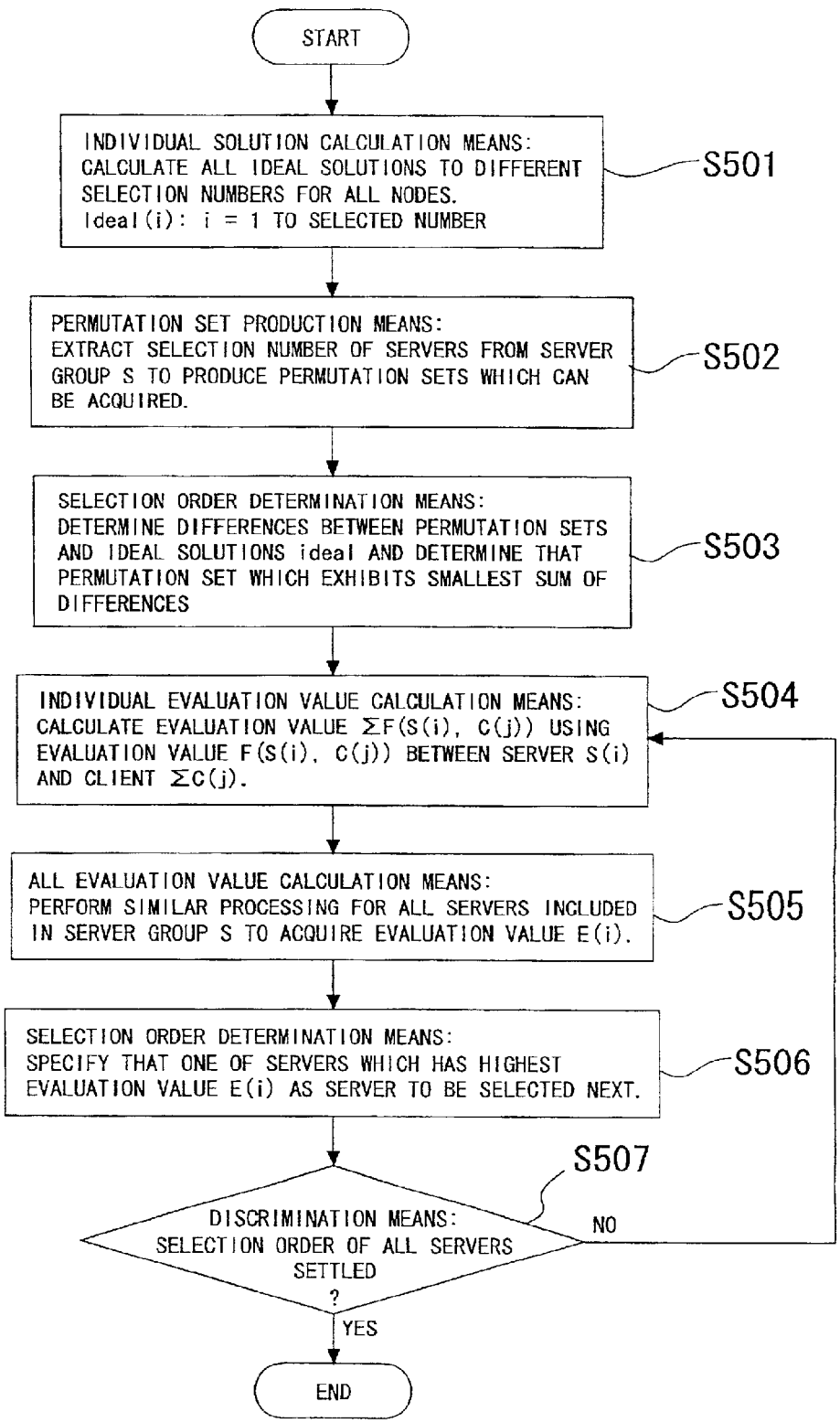
FIG. 6 is a flow chart illustrating a further server selection order determination method of the data distribution system of FIG. 1.

Referring to FIG. 6, the server selection order determination section includes ideal solution calculation means for determining ideal solutions within a designated number of reception servers (step S601), permutation set production means for producing a permutation set of a designated number of reception servers from within a group of reception servers (step S602), selection order determination means for comparing the results determined in steps S501 and S502 to determine a selection order of the designated number of reception servers (step S503), individual evaluation value calculation means for calculating evaluation values between those reception servers other than the designated number of reception servers and the clients (step S604), all evaluation value calculation means for determining evaluation values for the reception server group S (step S505), selection order determination means for comparing results of step S605 to determine a server selection order, and discrimination means for discriminating whether or not an order has been determined for all reception servers (step S507).

A server selection order determination method of the data distribution system having the configuration described above is described. In the server order determination method in the present working example, the server selection order determination means (steps S301 to S303) described in connection with the first working example is implemented by steps S501, S503 and S503 of FIG. 6, and the server selection order determination means (steps S401 to S404) described in connection with the second working example is implemented by steps S504, S506, S506 and S507 of FIG. 6.

Also in the present working example, it is assumed that input information is given already. As the input information, information regarding a set of reception servers, information regarding the clients, an evaluation expression regarding a reception server and clients, the number N of servers whose order should be determined by the first order determination means and so forth. The reception server group of the input information is represented by S, the individual reception servers are represented by S(i) (i=1, ..., n), the set of clients is presented by C, and the individual clients are represented by C(j) (j=1, ..., m). Further, the evaluation expression is given by the function F(S(i),C(j)) regarding S(i) and C(j).

First, the evaluation value E for an arrangement which includes a plurality of reception servers is given by the following expression (7). It is to be noted that the positions of the reception servers are given as a mesh (or matrix).

$$E = \sum_{i=1}^{n} \sum_{j=1}^{m} F(S(i), C(j)) \tag{7}$$

Then, the ideal solution calculation means of step S501 is used to determine the ideal solutions for reception server arrangements from one server to N servers. This method is performed by making use of the evaluation value of the node arrangement where a plurality of reception servers are included and determining a combination of arranged reception servers whose evaluation value is highest in accordance with the evaluation method for each of the cases wherein the number of reception servers is 1, ..., N. The resulting ideal solutions are represented as Ideal(i) (i=1, ..., N).

Then, the permutation set production means of step S502 produces permutation sets of N reception servers from the reception server group S. In the present working example, nPN permutation sets are produced.

Then, the selection order determination means of step S503 makes use of the ideal solutions determined in step S501 and the permutation sets determined in step S502. A certain one of the permutation sets determined in step S502 is represented by P(i) (i indicates an order number from the top in the permutation and is 1, ..., N). First, the evaluation value E(1) for the server arrangement of P(1) is determined first, and then the difference diff(1) of the evaluation value E(1) from the evaluation value of the ideal solution Ideal(1) where the number of reception servers is 1 is determined.

Then, it is assumed that two reception servers of P(1) and P(2) are selected, and the evaluation value E(2) for the two reception servers is determined and then the difference diff(2) of the evaluation value E(2) from the ideal solution Ideal(2) is determined. Then, the processing described is repeated by N times equal to the number of the reception servers to determine diff(i) (i=1, ..., n). Where the sum of the differences is represented by D, D is given by the following expression (8):

$$D = \sum_{i=1}^{N} diff(i) \tag{8}$$

This process is performed for all of the permutation sets produced in step S302, and the sum D of the differences from the ideal solution for each permutation set is determined. Then, that one of the sums D determined for all of the permutation sets which has the lowest value is determined as the optimum order of the number of reception servers up to N.

Then, in order to determine the order of the servers other than the N servers, the results determined in steps S501, S502 and S503 are passed to step S504. The individual evaluation value calculation means of step S504 and the all evaluation value calculation means of step S505 determine the evaluation values for those of the servers of the reception server group S which have not been selected as yet. The method of determination of the evaluation values is similar to that of the all evaluation value calculation means in the second working example described hereinabove. Then, the selection order determination means of step S506 selects the highest one of the evaluation values determined in steps S504 and S505 and specifies the corresponding reception server as a reception server to be selected next. Then, it is discriminated in step S507 whether or not the selection order has been determined for all reception servers. If the selection order has not been determined, then the processing in steps S504, S505 and S506 is repeated until the selection order is determined for all servers included in the reception server group S.

The combination of the selection order determination means described above in connection with the first and second working examples which employ different evaluation methods in this manner allows configuration of a more flexible selection order determination system.

WORKING EXAMPLE 4

Figure 7:
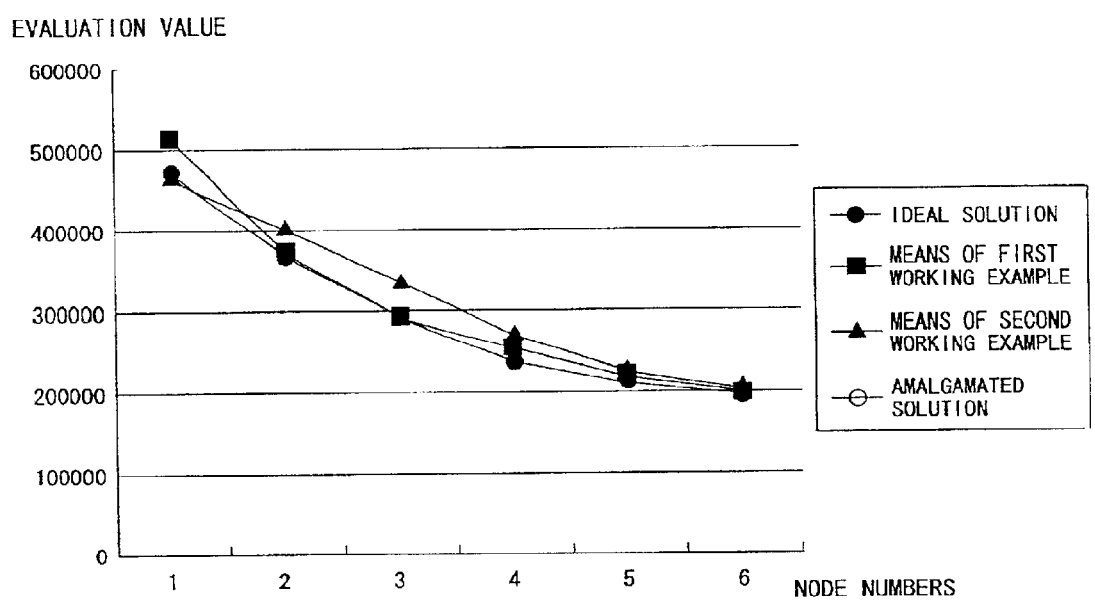
FIG. 7 is a diagram illustrating ideal solutions and solutions by the selection order determination methods of FIGS. 4, 5 and 6 for comparison.
Figure 8:
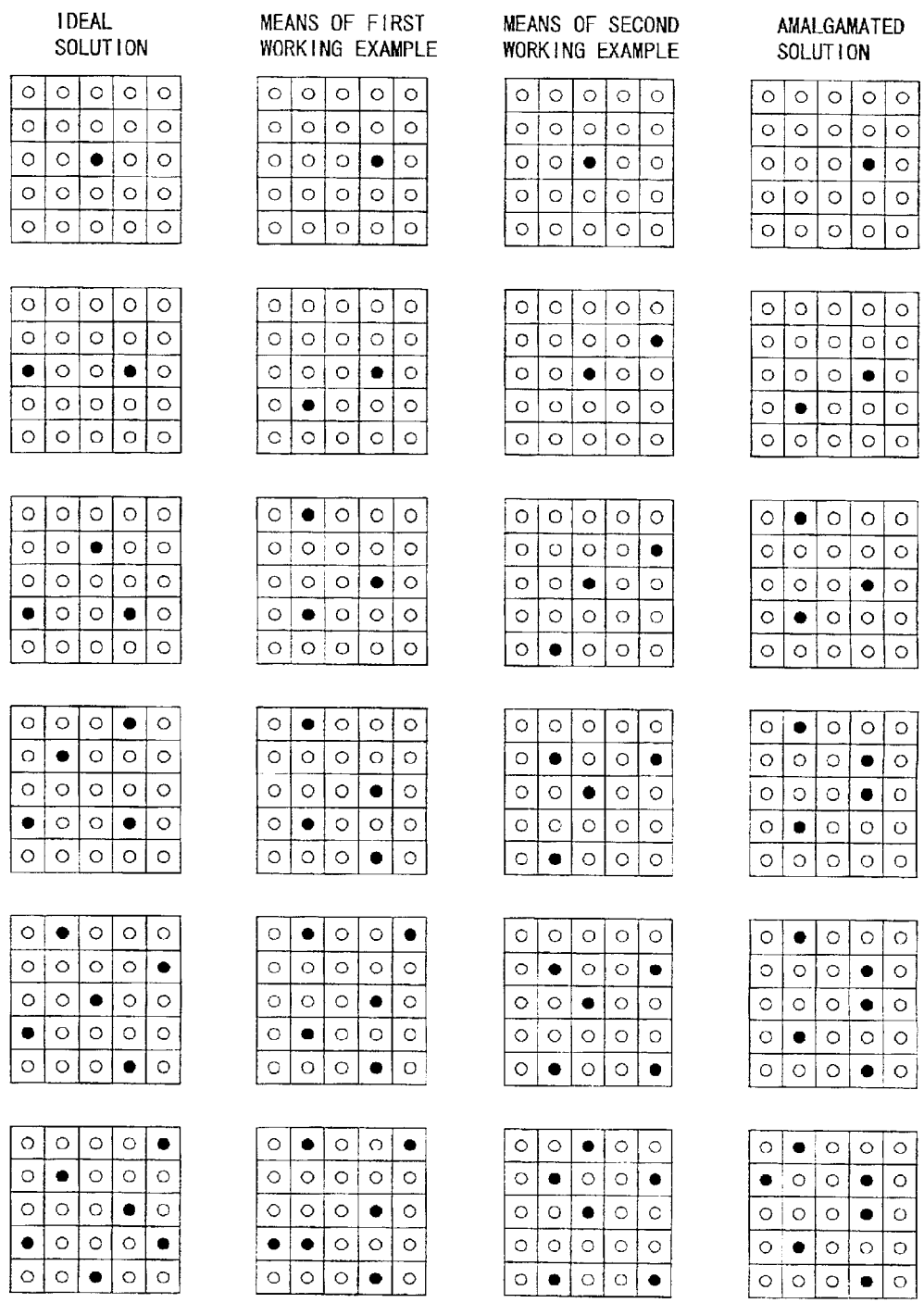
FIG. 8 is a diagrammatic view illustrating a particular example of ideal solutions and solutions by the selection order determination methods of FIGS. 4, 5 and 6.

Now, the data distribution method and an example of data distribution according to the fourth working example of the present invention are described with reference to FIGS. 7 and 8. FIGS. 7 and 8 illustrate results of processing performed using the data distribution methods described above in connection with the first to third working examples, and particularly, FIG. 7 illustrates a relationship between the result of each working example and the ideal solution and FIG. 8 illustrates detailed results of the processing.

In the present working example, it is assumed that one reception receiver is present in each of cells of a 5×5 cell map and also clients are present uniformly. Also it is assumed that the evaluation expression in this instance is given, where the coordinates of each reception server are given by (Sx, Sy) and the coordinates of each client are given by (Cx, Cy), by the following expression (9):

$$F(S,C)=|Sx-Cx|+|Sy-Cy| \quad (9)$$

In such a situation as described above, an ideal solution, a solution by the order determination means in the first working example, a solution by the order determination means in the second working example and an amalgamated solution obtained by the combination of the two solutions are determined up to a point of time at which six reception servers are acquired for each of the solutions. The ideal solutions, the solutions by the means in the first working example, the solutions by the means in the second working example and the amalgamated solutions obtained as a result of the determination are illustrated for comparison among them in FIG. 7, and actual arrangements in the individual solutions are illustrated in FIG. 8. It is to be noted that the amalgamated solutions are determined such that, in selection of six servers, determination of up to three reception servers is performed by the order determination means in the first working example and determination of the other reception servers is performed by the order determination means in the second working example.

As seen from FIG. 7, a solution proximate to an ideal solution can be extracted using any one of the methods described hereinabove in connection with the first to third working examples, and the object that impartial accessing from clients is maintained can be achieved.

While a preferred embodiment of the present invention has been described using specific terms, such description is for illustrative purposes only, and it is to be understood that changes and variations may be made without departing from the spirit or scope of the following claims.

What is claimed is:

1. A data distribution system of a network on configuration, comprising:

a distribution server;
a plurality of reception servers for receiving data from said distribution server; and
a plurality of clients which utilize said reception servers;
said distribution server including order determination means for calculating an evaluation value between each of said reception servers and said clients based on a predetermined evaluation expression and determining an order of said reception servers to which data are to be transmitted in accordance with the evaluation values;
said order determination means selecting said reception servers so as to be accessed impartially from said clients even if a reception server to be used is increased.

2. A data distribution system as claimed in claim 1, wherein said order determination means includes:

ideal solution calculation means for selecting combinations of x reception servers from among said reception servers, whose number is n, n being an integer, x being an integer from 1 to n, calculating, for each of the combinations, an evaluation value between each of the reception servers belonging to the combination and the clients connected to the reception server in accordance with the evaluation value, evaluating the evaluation values of the combinations in accordance with an evaluation method determined in advance to select the highest evaluation value from among the evaluation values, determining the selected evaluation value as an ideal solution for the x reception servers, successively determining the ideal solution for x=1 to n to determine a set of n ideal solutions and storing the ideal solutions as evaluation values of the entire network;
permutation set production means for producing a set of permutations of the n reception servers; and
selection order determination means for selecting y reception servers from each of the permutations produced by said permutation set production means, y being an integer successively increasing from 1 to n, calculating evaluation values between the y reception servers and those clients connected to the y reception servers in accordance with the evaluation expression, subtracting the ideal solution for the y reception servers determined by said ideal solution calculation means from the evaluation values to determine differences, adding the differences for y=1 to n to calculate a difference sum for the permutation, determining the difference sum for all of the permutations and selecting the permutation which exhibits the smallest difference sum.

3. A data distribution system as claimed in claim 1, wherein said order determination means includes:

individual evaluation value calculation means for calculating, for each of the n reception servers, an evaluation value between the reception server and those clients connected to the reception server in accordance with the evaluation expression;
all evaluation value calculation means for determining the evaluation value with regard to all of the n reception servers and calculating a set of the evaluation values;
selection order determination means for evaluating the set of evaluation values produced by said all evaluation value calculation means in accordance with an evaluation method determined in advance to select that one of the reception servers which corresponds to the highest evaluation value and excepting the selected reception server from the group of n reception servers; and discrimination means for discriminating whether or not the selection order of all of the reception servers is determined finally.

4. A data distribution system as claimed in claim 1, wherein said order determination means includes:

ideal solution calculation means for selecting combinations of x reception servers from among said reception servers, whose number is n, n being an integer, x being an integer from 1 to n, calculating, for each of the combinations, an evaluation value between each of the reception servers belonging to the combination and the clients connected to the reception server in accordance with the evaluation value, evaluating the evaluation values of the combinations in accordance with an evaluation method determined in advance to select the highest evaluation value from among the evaluation values, determining the selected evaluation value as an ideal solution for the x reception servers, successively determining the ideal solution for x=1 to n to determine a set of n ideal solutions and storing the ideal solutions as evaluation values of the entire network;

permutation set production means for producing a set of permutations of the n reception servers;

first selection order determination means for selecting y reception servers from each of the permutations produced by said permutation set production means, y being an integer successively increasing from 1 to n, calculating evaluation values between the y reception servers and those clients connected to the y reception servers in accordance with the evaluation expression, subtracting the ideal solution for the y reception servers determined by said ideal solution calculation means from the evaluation values to determine differences, adding the differences for y=1 to n to calculate a difference sum for the permutation, determining the difference sum for all of the permutations and selecting the permutation which exhibits the smallest difference sum;

individual evaluation value calculation means for calculating, for each of then reception servers, an evaluation value between the reception server and those clients connected to the reception server in accordance with the evaluation expression;

all evaluation value calculation means for determining the evaluation value with regard to all of the n reception servers and calculating a set of the evaluation values;

second selection order determination means for evaluating the set of evaluation values produced by said all evaluation value calculation means in accordance with an evaluation method determined in advance to select that one of the reception servers which corresponds to the highest evaluation value and excepting the selected reception server from the group of n reception servers; and discrimination means for discriminating whether or not the selection order of all of the reception servers is determined finally.

5. A data distribution system as claimed in claim 4, wherein the selection order of z ones of the set of n reception servers is determined by said ideal solution calculation means, said permutation set production means and said first selection order determination means, z being an integer equal to or greater than 2 but equal to or smaller than n−2, and the selection order of the remaining reception servers is determined by said individual evaluation value calculation means, said all evaluation value calculation means and said second selection order determination means.

6. A data distribution system as claimed in claim 1, wherein, where the coordinates of each of said reception servers are represented by (Sx, Sy) and the coordinates of each of said clients are presented by (Cx, Cy), the evaluation value is given by |Sx−Cx|+|Sy−Cy|.

7. A data distribution method for a data distribution system of a network configuration which includes a distribution server, a plurality of reception servers for receiving data from said distribution server, and a plurality of clients which utilize said reception servers, comprising:

an order determination step executed by said distribution server of calculating an evaluation value between each of said reception servers and said clients based on a predetermined evaluation expression and determining an order of said reception servers to which data are to be transmitted in accordance with the evaluation values such that said reception servers are selected so as to be accessed impartially from said clients even if a reception server to be used is increased.

8. A data distribution method as claimed in claim 7, wherein the order determination step for selection of said reception servers includes:

an ideal solution calculation step of selecting combinations of x reception servers from among said reception servers, whose number is n, n being an integer, x being an integer from 1 to n, calculating, for each of the combinations, an evaluation value between each of the reception servers belonging to the combination and the clients connected to the reception server in accordance with the evaluation value, evaluating the evaluation values of the combinations in accordance with an evaluation method determined in advance to select the highest evaluation value from among the evaluation values, determining the selected evaluation value as an ideal solution for the x reception servers, successively determining the ideal solution for x=1 to n to determine a set of n ideal solutions and storing the ideal solutions as evaluation values of the entire network;

a permutation set production step of producing a set of permutations of the n reception servers; and a selection order determination step of selecting y reception servers from each of the permutations produced by the permutation set production step, y being an integer successively increasing from 1 to n, calculating evaluation values between the y reception servers and those clients connected to the y reception servers in accordance with the evaluation expression, subtracting the ideal solution for the y reception servers determined by the ideal solution calculation step from the evaluation values to determine differences, adding the differences for y=1 to n to calculate a difference sum for the permutation, determining the difference sum for all of the permutations and selecting the permutation which exhibits the smallest difference sum.

9. A data distribution method as claimed in claim 7, wherein the order determination step for selection of said reception servers includes:

an individual evaluation value calculation step of calculating, for each of then reception servers, an evaluation value between the reception server and those clients connected to the reception server in accordance with the evaluation expression;

an all evaluation value calculation step of determining the evaluation value with regard to all of the n reception servers and calculating a set of the evaluation values;

a selection order determination step of evaluating the set of evaluation values produced by the all evaluation value calculation step in accordance with an evaluation method determined in advance to select that one of the reception servers which corresponds to the highest evaluation value and excepting the selected reception server from the group of n reception servers; and a discrimination step of discriminating whether or not the selection order of all of the reception servers is determined finally.

10. A data distribution method as claimed in claim 7, wherein the order determination step for selection of said reception servers includes:

an ideal solution calculation step of selecting combinations of x reception servers from among said reception servers, whose number is n, n being an integer, x being an integer from 1 to n, calculating, for each of the combinations, an evaluation value between each of the reception servers belonging to the combination and the clients connected to the reception server in accordance with the evaluation value, evaluating the evaluation values of the combinations in accordance with an evaluation method determined in advance to select the highest evaluation value from among the evaluation values, determining the selected evaluation value as an ideal solution for the x reception servers, successively determining the ideal solution for x=1 to n to determine a set of n ideal solutions and storing the ideal solutions as evaluation values of the entire network;

a permutation set production step of producing a set of permutations of the n reception servers;

a first selection order determination step of selecting y reception servers from each of the permutations produced by the permutation set production step, y being an integer successively increasing from 1 to n, calculating evaluation values between the y reception servers and those clients connected to the y reception servers in accordance with the evaluation expression, subtracting the ideal solution for the y reception servers determined by the ideal solution calculation step from the evaluation values to determine differences, adding the differences for y=1 to n to calculate a difference sum for the permutation, determining the difference sum for all of the permutations and selecting the permutation which exhibits the smallest difference sum;

an individual evaluation value calculation step of calculating, for each of the n reception servers, an evaluation value between the reception server and those clients connected to the reception server in accordance with the evaluation expression;

an all evaluation value calculation step of determining the evaluation value with regard to all of the n reception servers and calculating a set of the evaluation values;

a second selection order determination step of evaluating the set of evaluation values produced by the all evaluation value calculation step in accordance with an evaluation method determined in advance to select that one of the reception servers which corresponds to the highest evaluation value and excepting the selected reception server from the group of n reception servers; and a discrimination step of discriminating whether or not the selection order of all of the reception servers is determined finally.

11. A data distribution method as claimed in claim 10, wherein the selection order of z ones of the set of n reception servers is determined by the ideal solution calculation step, the permutation set production step and the first selection order determination step, z being an integer equal to or greater than 2 but equal to or smaller than n−2, and the selection order of the remaining reception servers is determined by the individual evaluation value calculation step, the all evaluation value calculation step and the second selection order determination step.

12. A data distribution method as claimed in claim 7, wherein, where the coordinates of each of said reception servers are represented by (Sx, Sy) and the coordinates of each of said clients are presented by (Cx, Cy), the evaluation value is given by $|Sx-Cx|+|Sy-Cy|$.

* * * * *